Patented Apr. 17, 1945

2,373,793

UNITED STATES PATENT OFFICE 2,373,793

METHOD OF RECOVERY OF SULPHONIC ACIDS FROM A REACTION MIXTURE RESULTING FROM SULPHURIC ACID TREATMENT OF AROMATIC OILS

Alfred G. Susie, Melrose, Mass., assignor, by mesne assignments, to Fuel Research Development Corporation, Boston, Mass., a corporation of Massachusetts No Drawing. Application October 8, 1942, Serial No. 461,332

5 Claims. (Cl. 260—505)

This invention relates to the preparation of sulphonic acids and more particularly to the separation of the sulphonic acids produced by the treatment of aromatic-rich hydrocarbon oils resultant from an oil-cracking operation and essentially comprising carbon and hydrogen atoms only with sulphonating agents, such as sulphuric acid.

It is the general object of my invention to provide a simple method for separating the sulphonic acids produced by the action of a sulphonating agent on aromatic-rich oils.

This invention is based on the discovery that certain liquid oxygenated organic compounds which are only slightly soluble in water, and particularly those capable of forming oxonium compounds, when added in small amounts to the diluted sulphonation reaction mixture, either before or after the removal of the unsulphonated oils therefrom, will cause a clear separation of the sulphonic acids from the aqueous sulphuric acid and from the unsulphonated oil, if present, and will leave an acid solution which may be fortified and re-used or from which the acid may be recovered.

More particularly, the oxygenated organic compounds of the nature specified which are most satisfactory for use in this capacity are those which are liquid and which may be selected from the following classes of organic compounds: namely, alcohols, aldehydes, ketones, esters, ethers, carboxylic acids, phenols, and related compounds. Illustrative examples of compounds falling within these classes are:

Alcohols:
    Fusel oil
    Amyl alcohol
    Butyl alcohol
    Benzyl alcohol

Aldehydes:
    Butyraldehyde
    Salicylaldehyde
    Heptaldehyde
    2-ethyl hexanal
    Benzaldehyde Ketones:
    Di-n-propyl ketone
    Methyl n-propyl ketone
    Methyl isobutyl ketone
    Methyl n-amyl ketone
    Acetophenone
    Cyclohexanone Esters:
    Butyl acetate
    Amyl acetate
    2-ethyl hexyl acetate
    Butyl carbitol acetate
    Methyl salicylate Ethers:
    Ethyl ether
    B,B'-dichloro diethyl ether
    Benzyl cellosolve
    Methyl m-tolyl ether
    Veratrole Carboxylic acids:
    n.Caproic acid
    2-ethyl butyric acid
    n.Heptylic acid
    n.Caprylic acid
    2-ethyl hexanoic acid Phenols:
    Phenol
    Cresol
    Xylenol Nitrobenzene While capable of general application, this invention has been developed primarily for the treatment of mixed aromatic hydrocarbons, such as may be produced by the cracking of crude petroleum oils or residues in an upright, externally heated retort, such for instance as is shown and described in the prior application of Chatterton and Paffen, Serial No. 332,154, filed April 29, 1940.

The sulphonic acids and their derivatives obtained from these aromatic-rich oils possess excellent properties, particularly as emulsifying agents and as dispersing agents.

The following example illustrates the separation of the sulphonic acids from a typical sulphonation reaction mixture:

The aromatic hydrocarbon oil is first treated with sulphuric acid, which may be in the proportion of three parts 66° Baumé sulphuric acid by weight to two parts of aromatic hydrocarbons. The sulphuric acid is added gradually to the hydrocarbons and the mixture is preferably stirred mechanically and cooled in a water bath during the addition of the acid. The stirring is then continued at room temperature for a considerable period, such as two hours, until the evolution of heat ceases, after which the sulphonation mixture is diluted by adding water. The amount of water used at this point in the process may be approximately equal to the volume of the sulphonation mixture to which the water is added.

When this diluted mixture is allowed to stand, the unsulphonated oil separates as a top layer and may be decanted and removed.

After the unsulphonated oil has been removed, I introduce to the diluted sulphonation mixture approximately 1% by volume of an oxygenated organic additive which is only slightly soluble in water and which in this example is amyl alcohol. This mixture, after vigorous agitation, is then allowed to stand, and there results a further separation of the mixture into an upper brownish-black sulphonic acid layer and a lower aqueous sulphuric acid layer.

The upper layer of aryl sulphonic acids may then be decanted and removed, leaving the aqueous sulphuric acid for reclamation and further use.

I am aware that separation of sulphonic acids has been suggested by the addition of water-soluble salts, this being what is sometimes known as the "salting out" process. But this process is not satisfactory for the purposes contemplated herein, because the salts go into solution in the aqueous acid liquid and contaminate it so that the acid cannot be satisfactorily reclaimed from the solution nor can the acid solution be satisfactorily re-used.

The percentage of the oxygenated organic additive to be used varies in different compounds but I have observed that substantial separation of the sulphonic acid from the mixture does not begin to take place until the concentration of the additive has been increased sufficiently to prevent foaming. This will be understood by an illustration. For instance, if amyl alcohol is to be used and it is found that, when a certain percent of alcohol is added to a specimen of the sulphonic acid mixture, foaming takes place, it will also be found that no substantial separation of the sulphonic acid occurs. If the amount of amyl alcohol is increased until little or no foaming takes place, it will also be observed that substantial separation of sulphonic acid begins to occur. This observation forms a convenient guide to determine the concentration of the particular additive being used.

The aryl sulphonic acids are available for various commercial and industrial uses, either in acid form or conveniently as aryl sulphonates by neutralization with any desired base, such as soda ash or lime. The neutralized product may then be separated from the aqueous liquor by evaporation and the solid residue may be purified, if desired, by extraction with a suitable solvent, such as anhydrous methanol.

By the above-described and relatively simple process, I am able to produce either aryl sulphonic acids or desired derivatives of such acids from the sulphonation reaction of a complex mixture of hydrocarbons.

The rate of separation of the aryl sulphonic acids from the sulphonation reaction mixture depends to some extent on the amount of oxygenated organic additive used, and the rate of separation generally increases with an increase in the amount of additive. The amount of additive required also increases somewhat with an increase in the boiling range of the aromatic oil under treatment. In general, I have found that adding the organic additive in amounts equal to 1% to 5% of the volume of the reaction mixture produce good results, but under some circumstances amounts outside of this range may be satisfactorily employed.

The sulphuric acid solution which remains after removal of the aryl sulphonic acids may also be utilized in place of water in the dilution of subsequent sulphonation reaction mixtures. The additive which is present in the solution may then immediately cause separation of the sulphonic acids from the sulphonation mixture and the use of additional separating agent may not be necessary.

By this procedure, also, the sulphuric acid content of the spent aqueous sulphuric acid may be built up substantially, so that it may be economically fortified with sulphur trioxide or oleum and used as a sulphonating agent in subsequent sulphonations.

Having thus described my invention and the advantages thereof, I do not wish to be limited to the procedure herein disclosed, otherwise than as set forth in the claims, but what I claim is:

1. In the method of recovery of aromatic sulphonic acids from an aqueous sulphonation reaction mixture resulting from sulphuric acid treatment of aromatic hydrocarbon oils resulted from an oil-cracking operation, the steps of diluting said reaction mixture with water, and then reducing the capacity of the aqueous phase for holding the sulphonic acids in solution by adding a liquid oxygenated organic compound which is at most only slightly soluble in water and in an amount sufficient only to cause the sulphonic acids to separate from the dilute reaction mixture but said additive effecting no substantial solution of the sulphonic acids in the additive.

2. The method as set forth in claim 1, in which the volume of the additive is in the amount of 1% to 5% of the volume of the diluted reaction mixture.

3. The method as set forth in claim 1, in which the sulphonation reaction mixture is diluted by adding water containing some part of the dilute sulphuric acid recovered from a previous separating operation and having some proportion of oxygenated additive therein.

4. The method of recovery of sulphonic acids as set forth in claim 1, in which the additive is selected from the following classes of oxygenated organic compounds: namely, alcohols, ketones, esters, aldehydes, ethers, carboxylic acids and phenols which are at most only slightly soluble in water.

5. In the method of recovery of aromatic sulphonic acids from an aqueous sulphonation reaction mixture resulting from sulphuric acid treatment of aromatic hydrocarbon oils resultant from an oil-cracking operation, the steps of diluting said reaction mixture with water, then reducing the capacity of the aqueous phase for holding the sulphonic acids in solution by adding a liquid oxygenated organic compound which is at most only slightly soluble in water and in an amount sufficient only to cause the sulphonic acids to separate from the dilute reaction mixture but said additive effecting no substantial solution of the sulphonic acids in the additive, and then removing the separated sulphonic acids by decantation.

ALFRED G. SUSIE.